(12) United States Patent
Yadlapalli et al.

(10) Patent No.: US 12,461,730 B2
(45) Date of Patent: Nov. 4, 2025

(54) SYSTEM AND METHOD FOR UNIFORM CLOUD PROVIDER-SPECIFIC PRODUCT DEPLOYMENT

(71) Applicant: Dell Products, L.P., Round Rock, TX (US)

(72) Inventors: Vasu Yadlapalli, Karnataka (IN); Dmitry Krivenok, The Gallops (IE)

(73) Assignee: Dell Products L.P., Round Rock, TX (US)

( * ) Notice: Subject to any disclaimer, the term of this patent is extended or adjusted under 35 U.S.C. 154(b) by 408 days.

(21) Appl. No.: 18/075,508

(22) Filed: Dec. 6, 2022

(65) Prior Publication Data
US 2024/0184557 A1    Jun. 6, 2024

(51) Int. Cl.
*G06F 8/61*     (2018.01)
*G06F 9/54*     (2006.01)

(52) U.S. Cl.
CPC .  *G06F 8/61* (2013.01); *G06F 9/54* (2013.01)

(58) Field of Classification Search
CPC ... G06F 8/60; G06F 8/61; G06F 9/505; G06F 9/5077; G06F 9/54
See application file for complete search history.

(56) References Cited

U.S. PATENT DOCUMENTS

| | | | |
|---|---|---|---|
| 11,477,090 B1 * | 10/2022 | Birsan | H04L 41/0895 |
| 11,861,342 B2 * | 1/2024 | Shah | H04L 67/10 |
| 11,936,757 B1 * | 3/2024 | Benny | H04L 61/4511 |
| 2019/0095225 A1 * | 3/2019 | Nandagopal | G06F 40/137 |
| 2021/0208859 A1 * | 7/2021 | Kapadia | H04L 67/1097 |
| 2021/0382727 A1 * | 12/2021 | Vigil | G06F 9/5022 |
| 2023/0129763 A1 * | 4/2023 | Kovachev | G06F 16/24522 707/722 |
| 2024/0086157 A1 * | 3/2024 | Patil | G06F 8/36 |

* cited by examiner

*Primary Examiner* — Marina Lee
(74) *Attorney, Agent, or Firm* — Brian J. Colandreo; Heath M. Sargeant; Holland & Knight LLP

(57) ABSTRACT

A method, computer program product, and computing system for receiving a selection of a product associated with a cloud provider for deployment in a cloud computing environment. A cloud provider-specific product container associated with the product may be exposed to a cloud manager. An input parameter file may be obtained from a cloud provider using the cloud provider-specific product container. A plurality of input parameters may be processed based upon, at least in part, the input parameter file. The product may be deployed in the cloud computing environment using the cloud provider-specific product container and the plurality of input parameters.

12 Claims, 8 Drawing Sheets

SYSTEM AND METHOD FOR UNIFORM CLOUD PROVIDER-SPECIFIC PRODUCT DEPLOYMENT

BACKGROUND

Storing and safeguarding electronic content may be beneficial in modern business and elsewhere. Accordingly, various methodologies may be employed to protect and distribute such electronic content.

Storage of electronic content may be deployed in a cloud computing environment. A cloud computing environment is a technological environment that provides cloud-based computing services over a set of hosted servers and applications which are accessible over the internet or other network configuration. Examples of cloud-based computing services include applications and development platforms, to servers, storage, and virtual computing systems. Cloud-based computing services are provided by cloud computing providers (cloud providers) as a service over the internet. Their services include servers, virtual machines, applications, application development platforms, storage, databases, and/or networking.

With a cloud provider, various products may be offered. A product is a software defined product that operates in a cloud computing environment and provides storage, data protection, security, and/or other capabilities. Each product generally requires a different set of input parameters and validations. As such, managing products centrally is a tedious job of integrating together product-specific business logic to be updated in a cloud manger. In this manner, such integration of product-specific business logic introduces very tight coupling between the cloud manager and products. This may result in any changes in a product or associated interfaces requiring a new software release cycle which will not only delay the time-to-market period, but also adds significant development, testing, and deployment costs. Additionally, users often need to traverse cloud provider/product specific user interfaces, application programing interfaces (APIs), and/or command-line interfaces (CLIs) to manage their products lifecycle which is not an efficient use of resources and time. This also increases the complexity of monitoring and troubleshooting in case of any issues with infrastructure or the product itself.

SUMMARY OF DISCLOSURE

In one example implementation, a computer-implemented method executed on a computing device may include, but is not limited to, receiving a selection of a product associated with a cloud provider for deployment in a cloud computing environment. A cloud provider-specific product container associated with the product may be exposed to a cloud manager. An input parameter file may be obtained from a cloud provider using the cloud provider-specific product container. A plurality of input parameters may be processed based upon, at least in part, the input parameter file. The product may be deployed in the cloud computing environment using the cloud provider-specific product container and the plurality of input parameters.

One or more of the following example features may be included. Receiving the selection of the product to deploy in the cloud computing environment may include receiving the selection of the product from a catalog of products. Exposing the cloud provider-specific product container may include defining one or more Identity and Access Management (IAM) policies for the product. The cloud provider-specific product container may include a plurality of input parameter validations. A dynamic user interface may be generated using the input parameter file. The input parameter file may be a YAML file. Generating the dynamic user interface may include converting the input parameter file from YAML format into a graphical user interface. Processing the plurality of input parameters may include receiving, at the dynamic user interface, the plurality of input parameters based upon, at least in part, the input parameter file. Deploying the product in the cloud computing environment may include deploying the product in the cloud computing environment by executing one or more application programming interfaces (APIs) exposed by the cloud provider-specific product container and the plurality of input parameters.

In another example implementation, a computer program product resides on a computer readable medium that has a plurality of instructions stored on it. When executed by a processor, the instructions cause the processor to perform operations that may include, but are not limited to, receiving a selection of a product associated with a cloud provider for deployment in a cloud computing environment. A cloud provider-specific product container associated with the product may be exposed to a cloud manager. An input parameter file may be obtained from a cloud provider using the cloud provider-specific product container. A plurality of input parameters may be processed based upon, at least in part, the input parameter file. The product may be deployed in the cloud computing environment using the cloud provider-specific product container and the plurality of input parameters.

One or more of the following example features may be included. Receiving the selection of the product to deploy in the cloud computing environment may include receiving the selection of the product from a catalog of products. Exposing the cloud provider-specific product container may include defining one or more Identity and Access Management (IAM) policies for the product. The cloud provider-specific product container may include a plurality of input parameter validations. A dynamic user interface may be generated using the input parameter file. The input parameter file may be a YAML file. Generating the dynamic user interface may include converting the input parameter file from YAML format into a graphical user interface. Processing the plurality of input parameters may include receiving, at the dynamic user interface, the plurality of input parameters based upon, at least in part, the input parameter file. Deploying the product in the cloud computing environment may include deploying the product in the cloud computing environment by executing one or more application programming interfaces (APIs) exposed by the cloud provider-specific product container and the plurality of input parameters.

In another example implementation, a computing system includes at least one processor and at least one memory architecture coupled with the at least one processor, wherein the at least one processor configured to receive a selection of a product associated with a cloud provider for deployment in a cloud computing environment. A cloud provider-specific product container associated with the product may be exposed to a cloud manager. An input parameter file may be obtained from a cloud provider using the cloud provider-specific product container. A plurality of input parameters may be processed based upon, at least in part, the input parameter file. The product may be deployed in the cloud computing environment using the cloud provider-specific product container and the plurality of input parameters.

One or more of the following example features may be included. Receiving the selection of the product to deploy in the cloud computing environment may include receiving the selection of the product from a catalog of products. Exposing the cloud provider-specific product container may include defining one or more Identity and Access Management (IAM) policies for the product. The cloud provider-specific product container may include a plurality of input parameter validations. A dynamic user interface may be generated using the input parameter file. The input parameter file may be a YAML file. Generating the dynamic user interface may include converting the input parameter file from YAML format into a graphical user interface. Processing the plurality of input parameters may include receiving, at the dynamic user interface, the plurality of input parameters based upon, at least in part, the input parameter file. Deploying the product in the cloud computing environment may include deploying the product in the cloud computing environment by executing one or more application programming interfaces (APIs) exposed by the cloud provider-specific product container and the plurality of input parameters.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
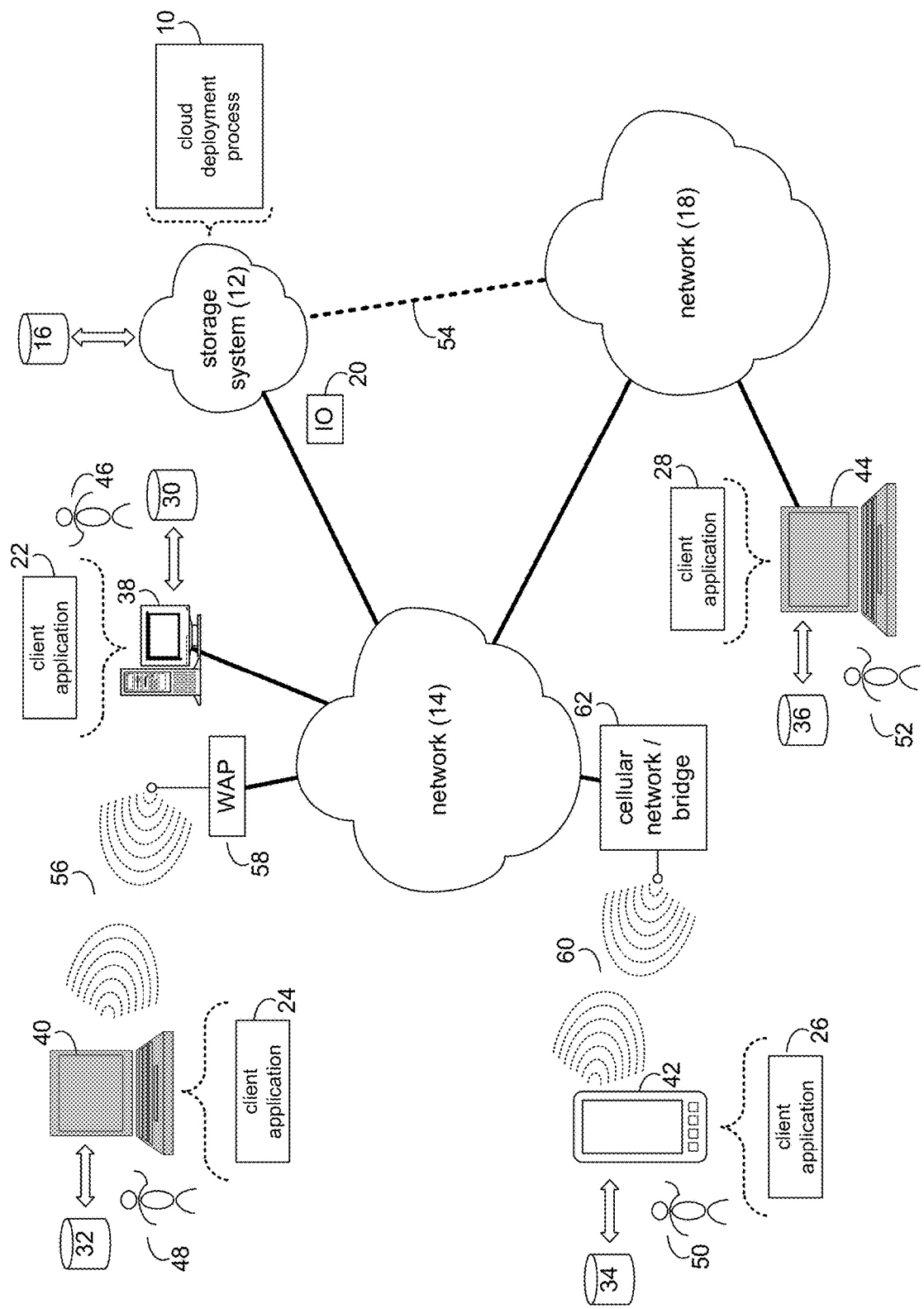
FIG. 1 is an example diagrammatic view of a storage system and a cloud deployment process coupled to a distributed computing network according to one or more example implementations of the disclosure.

Referring to FIG. 1, there is shown cloud deployment process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of cloud deployment process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of cloud deployment process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a cloud deployment process, such as cloud deployment process 10 of FIG. 1, may include but is not limited to, receiving a selection of a product associated with a cloud provider for deployment in a cloud computing environment. A cloud provider-specific product container associated with the product may be exposed to a cloud manager. An input parameter file may be obtained from a cloud provider using the cloud provider-specific product container. A plurality of input parameters may be processed based upon, at least in part, the input parameter file. The product may be deployed in the cloud computing environment using the cloud provider-specific product container and the plurality of input parameters.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
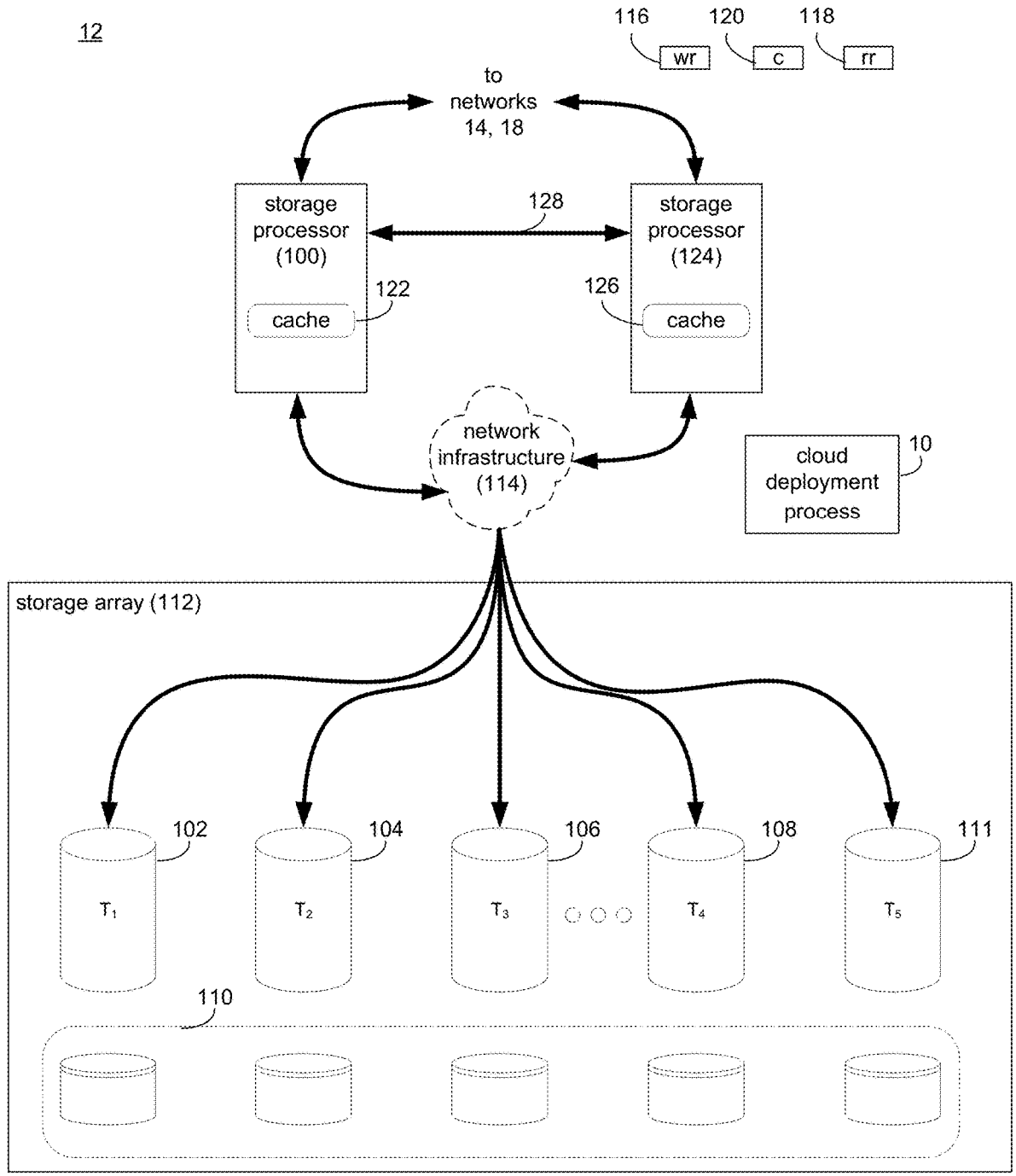
FIG. 2 is an example diagrammatic view of the storage system of FIG. 1 according to one or more example implementations of the disclosure.
Figure 3:
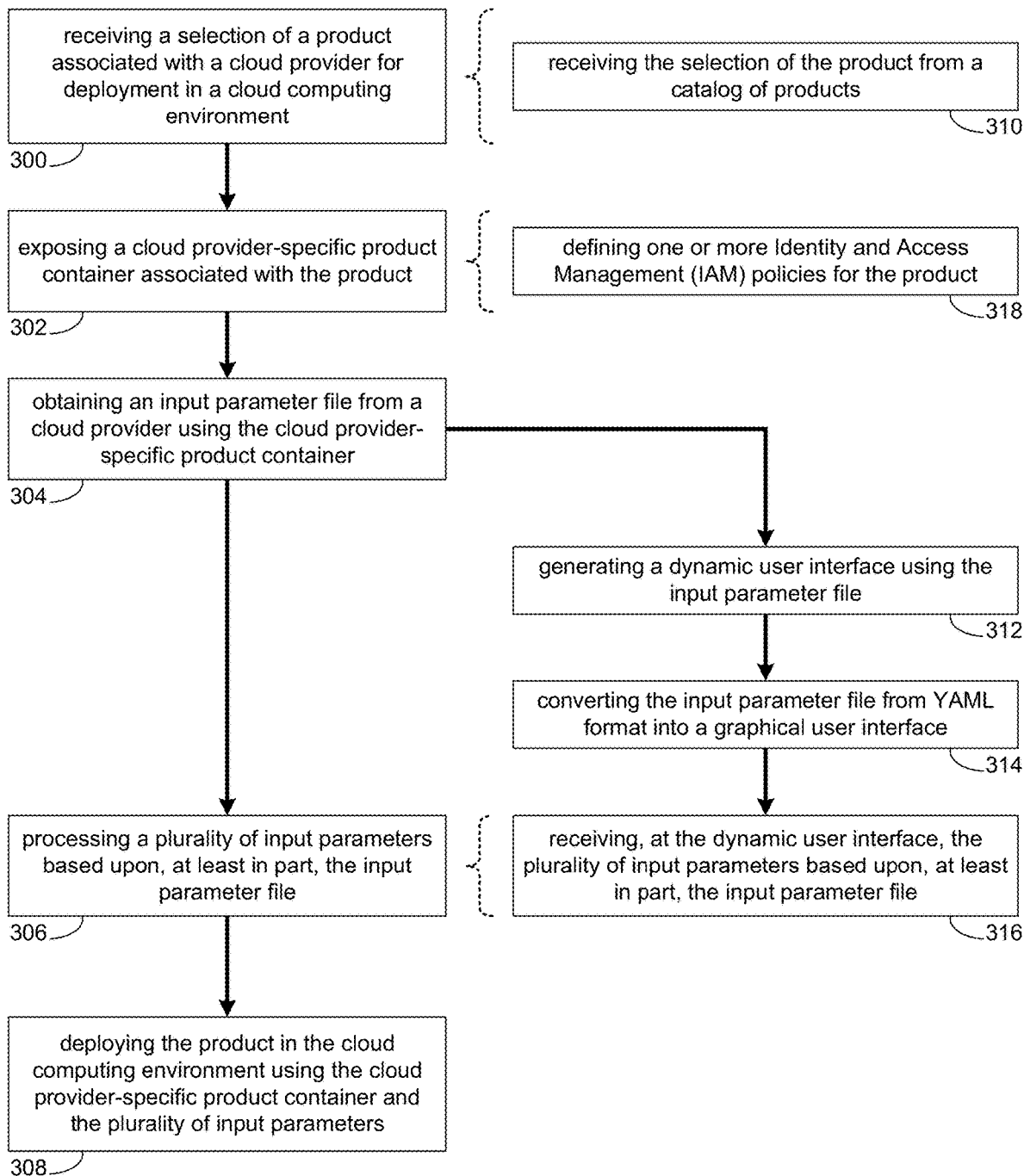
FIG. 3 is an example flowchart of cloud deployment process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electromechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cloud deployment process 10. The instruction sets and subroutines of cloud deployment process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of cloud deployment process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of cloud deployment process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of cloud deployment process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from being overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of cloud deployment process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of cloud deployment process 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Cloud Deployment Process:

Referring also to the examples of FIGS. 3-8 and in some implementations, cloud deployment process 10 may receive 300 a selection of a product associated with a cloud provider for deployment in a cloud computing environment. A cloud provider-specific product container associated with the product may be exposed 302 to a cloud manager. An input parameter file may be obtained 304 from a cloud provider using the cloud provider-specific product container. A plurality of input parameters may be processed 306 based upon, at least in part, the input parameter file. The product may be deployed 308 in the cloud computing environment using the cloud provider-specific product container and the plurality of input parameters.

As will be discussed in greater detail below, implementations of the present disclosure may allow for the abstraction of the operations from cloud manager when attempting to interface with multiple products from cloud providers. A product is a software defined product that operates in a cloud computing environment and provides storage, data protection, security, and/or other capabilities. Each product generally requires a different set of input parameters and validations. As such, managing products centrally is a tedious job of integrating together product-specific business logic to be updated in a cloud manger. In this manner, such integration of product-specific business logic introduces very tight coupling between the cloud manager and products. This may result in any changes in a product or associated interfaces requiring a new software release cycle which will not only delay the time-to-market period, but also adds significant development, testing, and deployment costs. Additionally, users often need to traverse cloud provider/product specific user interfaces, application programing interfaces (APIs), and/or command-line interfaces (CLIs) to manage their products lifecycle which is not an efficient use of resources and time. This also increases the complexity of monitoring and troubleshooting in case of any issues with infrastructure or the product itself.

Accordingly, implementations of the present disclosure provide a uniform way of defining input parameters, validations, deployment and lifecycle management services using a product specific container in the cloud manager to eliminate all of these noted deficiencies. In this manner, the dependency between a cloud manager and product-specific teams can be minimized and the deployment and management of products in a cloud computing environment may be enhanced.

In some implementations, portions of the storage system (e.g., storage system 12) may be deployed in a cloud computing environment. A cloud computing environment is a technological environment that provides cloud-based computing services over a set of hosted servers and applications, which are accessible over the internet or other network configuration. Examples of cloud-based computing services include applications and development platforms, to servers, storage, and virtual computing systems. Cloud-based computing services are provided by cloud computing providers (cloud providers) as a service over the internet. Their services include servers, virtual machines, applications, application development platforms, storage, databases, and/ or networking. Users (individuals or entities) can subscribe to cloud computing services with varying pricing options to choose from. Examples of cloud providers include, but are not limited to, Microsoft® Azure® from Microsoft Corporation in the United States, Amazon Web Services™ (AWS™) from Amazon.com, Inc., and Google Cloud Platform™ from Google LLC.

Figure 4:
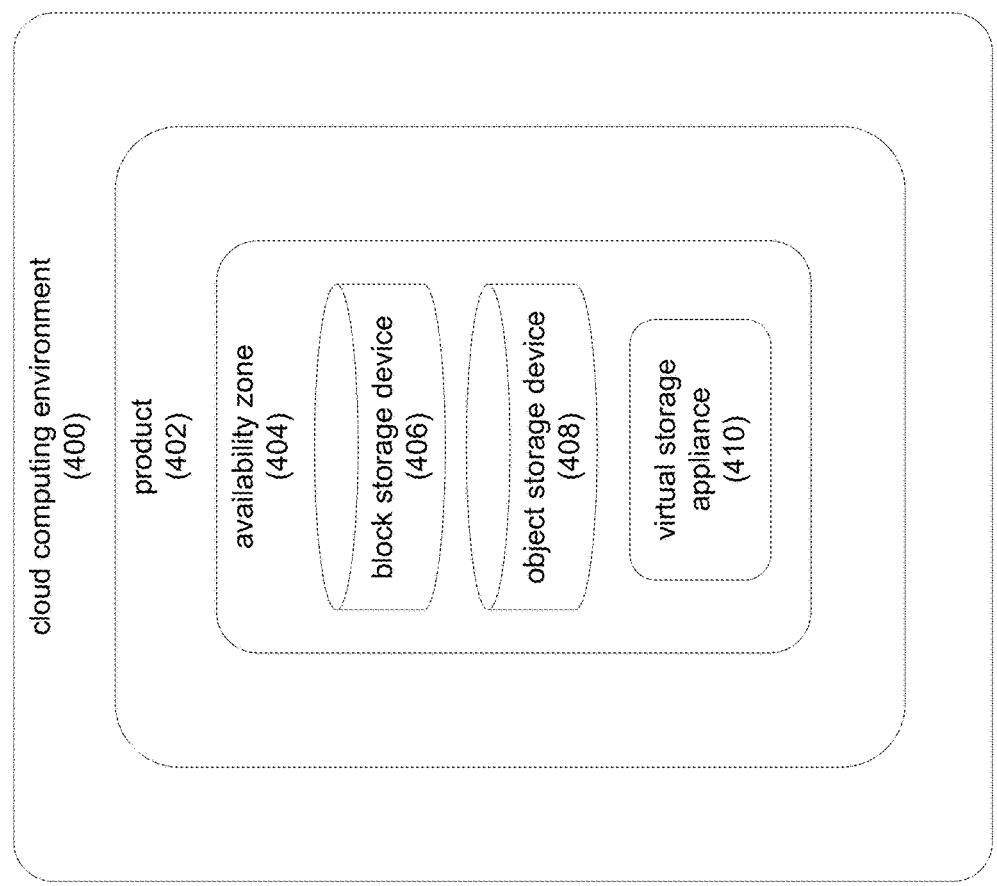
FIG. 4 is an example diagrammatic view of a cloud computing environment according to one or more example implementations of the disclosure.

Referring also to FIG. 4 and in some implementations, a cloud computing environment (e.g., cloud computing environment 400) may be configured to perform various cloud-based computing services. Cloud computing environment 400 may include various products. A product or cloud product (e.g., product 402) includes a software defined product that operates in the cloud computing environment (e.g., cloud computing environment 400) and provides storage, data protection, security, and/or other capabilities. As discussed above, each product may have different logic for input parameter validations, deployment steps, configuration and management operations on top of different cloud provider-specific services and integrations. As will be discussed in greater detail below, cloud deployment process 10 exposes a product-specific container to interface with each cloud provider to obtain these unique parameters and to facilitate management of each product.

In some implementations, each product may include availability zones (e.g., availability zone 404). An availability zone is an isolated data center or storage system located within specific regions in which public cloud services originate and operate. Cloud service providers typically have multiple worldwide availability zones. This helps ensure cloud customers have a stable connection to a cloud service in the geographic zone that is closest to them and/or that meets their specific needs. Users typically use availability zones for a variety of reasons, including compliance and proximity to customers. Cloud administrators can also choose to replicate services across multiple availability zones to decrease latency or protect resources. Administrators can move resources to another availability zone in the event of an outage. Specific cloud services may also be limited to particular regions or availability zones.

In some implementations, each availability zone (e.g., availability zone 404) may have access to or include various resources. For example, each availability zone (e.g., availability zone 404) may provide access to various storage resources (e.g., block storage device 406; object storage device 408; and virtual storage appliance (VSA) 410). In some implementations, a block storage device (e.g., block storage device 406) is a storage device deployed within the cloud computing environment that is configured to store data in equally sized blocks. This system offers performance advantages over traditional storage, and generally boasts lower latency. However, a block storage device is a premier storage device and is typically the most expensive. In one example, the cloud-based block storage device is Amazon Elastic Block Storage.

In some implementations, cloud-based object storage is a storage service in public cloud resources that is cost efficient. Cloud-based object storage is well suited for static data and its agility and flat nature means it can scale to extremely large quantities of data. In some implementations, the cloud-based objects have sufficient information for an application to find the data quickly. Cloud-based object storage also supports HTTP protocol for data transfer and most clients support HTTP. In one example, availability zone 404 may provide access to one or more cloud-based object storage devices (e.g., object storage device 408). In one example, object storage device 414 is an Amazon S3 storage device.

Cloud computing environments use virtualization technology, which allows for the creation of simulated virtual computers that behave like physical computers. Such computers are called Virtual Machines (VM). Though multiple VMs can be created on one physical server, VMs typically work as isolated independent machines and their files and other resources are not visible to one other. Virtualization allows more efficient use of hardware resources by running multiple VMs in the same hardware and serving multiple users or user applications at the same time, which helps to reduce the cost of computing.

In some implementations, a virtual storage appliance (VSA) may be deployed in the cloud computing environment. A VSA is a set of virtual machines in the cloud computing environment with storage devices that typically store an operating system, applications, and data. In the example of FIG. 4, a VSA (e.g., VSA 410) may be deployed within availability zone 404 of product 402. In one example, VSA 410 is a PowerStore™ virtual storage appliance available from Dell Technologies Inc. However, it will be appreciated that various VSAs may be used within the scope of the present disclosure.

In some implementations, cloud deployment process 10 receives 300 a selection of a product associated with a cloud provider for deployment in a cloud computing environment. For example, suppose a user desires to deploy a product of a particular cloud provider within a cloud computing environment. As discussed above, suppose that the user desires to deploy a particular product (e.g., a block storage device, an object storage device, a VSA, a network appliance, a security appliance, a data protection appliance, etc.). In this example, suppose that the product is associated with AWS™. In some implementations, deploying this AWS™ product may be problematic for cloud managers of a storage system. For example, each AWS™ product generally requires a different set of input parameters and validations from those of other cloud providers. As such, the process of updating and maintaining particular input parameters and validations for each product and cloud provider introduces significant issues for storage system administrators.

Figure 5:
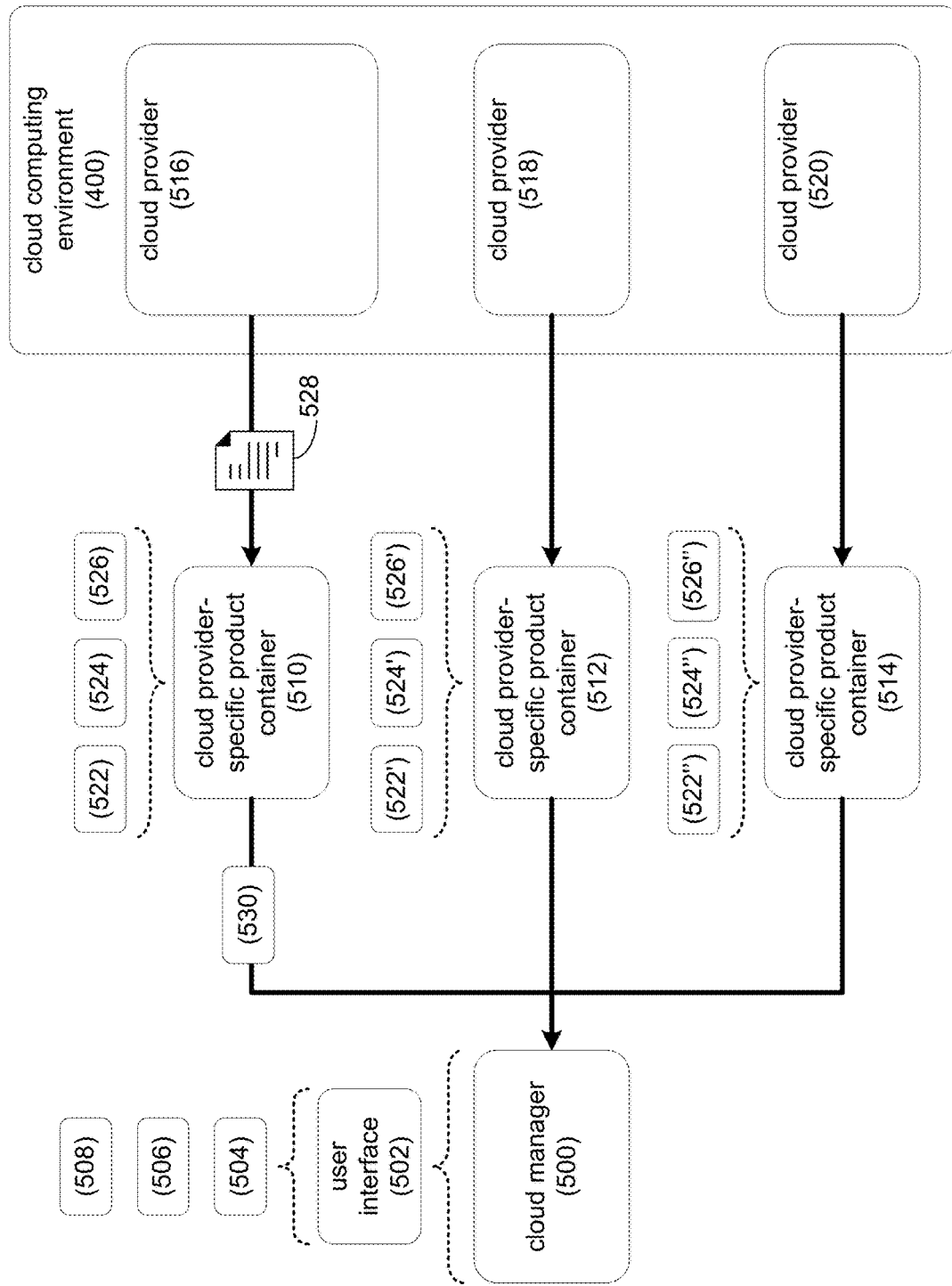
FIGS. 5-8 are example diagrammatic views of the cloud deployment process according to various example implementations of the disclosure.

In some implementations, cloud deployment process 10 may provide a user interface for receiving 300 a selection of a product associated with a cloud provider for deployment. For example and referring also to FIG. 5, a user may use a cloud manager (e.g., cloud manager 500) to manage the deployment and operation of multiple products in a cloud computing environment. In some implementations, a cloud manager (e.g., cloud manager 500) is a software component that deploys and provides lifecycle management for software-defined products running in public and hybrid cloud computing environments. In some implementations, cloud manager 500 may include a user interface (e.g., user interface 502) with a plurality of products associated with various cloud providers (e.g., products 504, 506, 508). In some implementations, receiving 300 the selection of the product to deploy in the cloud computing environment may include receiving 310 the selection of the product from a catalog of products. For example, cloud deployment process 10 may represent the plurality of products as a catalog or listing of products (e.g., products 504, 506, 508) from which the user may select particular products to deploy in the cloud computing environment (e.g., cloud computing environment 400). While FIG. 5 shows e.g., three products, it will be appreciated the cloud deployment process 10 may provide a catalog or listing with any number of products within the scope of the present disclosure.

In some implementations, cloud deployment process 10 exposes 302 a cloud provider-specific product container associated with the product to a cloud manager. A cloud provider-specific product container (e.g., cloud provider-specific product container 510, 512, 514) is a software component configured to provide an interface between a cloud manager and a cloud provider to generate an input parameter template for a particular product. For example and as will be discussed in greater detail below, the cloud provider-specific product container obtains input parameters for a particular product from the cloud provider for the user to specify or populate and to instantiate the product with the input parameters in the cloud computing environment. In some implementations, each cloud provider-specific product container may include various application programmable interfaces (APIs) configured to communicate with a particular cloud provider in the cloud computing environment. For example, suppose that cloud computing environment 400 includes e.g., three cloud providers (e.g., cloud providers 516, 518, 520). In this example, a cloud provider-specific product container may be generated for each cloud provider (e.g., cloud provider-specific product containers 510, 512, 514). As will be discussed in greater detail below, each product may interface with cloud manager 500 using the same APIs (e.g., APIs 522, 524, 526). Examples of these APIs include, but are not limited to, a deploy API, an undeploy API, a validate API, etc. In some implementations, these APIs may appear the same to cloud manager 500 such that cloud manager 500 may execute the APIs without modification. However, within each cloud provider-specific container, the APIs may be implemented uniquely for each cloud provider (e.g., APIs 522, 524, 526 within cloud provider-specific container 510; APIs 522', 524', 526' within cloud provider-specific container 512; and APIs 522", 524", 526" within cloud provider-specific container 514). In this manner, cloud deployment process 10 may expose 302 a cloud provider-specific container to the cloud manager such that the cloud manager can use execute APIs across any product for any cloud provider while using the cloud provider-specific containers to account for distinctions between cloud providers.

In some implementations, cloud deployment process 10 obtains 304 an input parameter file from a cloud provider using the cloud provider-specific product container. For example, an input parameter file is a definition template of input parameters for a particular product. In some implementations, the input parameter file is a YAML file. A YAML file is a human-readable data-serialization language that can be used for configuration files and in applications where data is being stored or transmitted. For example, a cloud provider-specific product container (e.g., cloud provider-specific product container 510) may process an input parameter file (e.g., input parameter file 528) as a YAML file. In this example, the cloud manager (e.g., cloud manager 500) has no dependency on input parameters to deploy the product on a specific cloud provider. The input parameters can be added/removed/deleted or otherwise modified by the product between versions and the cloud manager may obtain 304 these input parameters from the input parameter file obtained by the cloud provider-specific product container at runtime by parsing the input parameter file. As will be discussed in greater detail below, cloud deployment process 10 can convert the input parameter file (e.g., input parameter file 528) to a dynamic user interface using the YAML features of the input parameter file.

In some implementations, cloud deployment process 10 processes 306 a plurality of input parameters based upon, at least in part, the input parameter file. For example, cloud deployment process 10 may, using a cloud manager (e.g., cloud manager 500), process 306 prefill/fetch data from a selected cloud provider (e.g., cloud provider 516) using various APIs/CLI within the cloud provider-specific product container (e.g., cloud provider-specific product container 510) based on the selected product. In this manner, a user interface may be improved by providing a user with a list of pre-existing cloud resources (e.g. IDs of virtual private clouds, subnets, etc.) for the product. In some implementations, with the input parameter file (e.g., input parameter file 528), cloud deployment process 10 may provide a listing of input parameters to be defined by a user.

Figure 6:
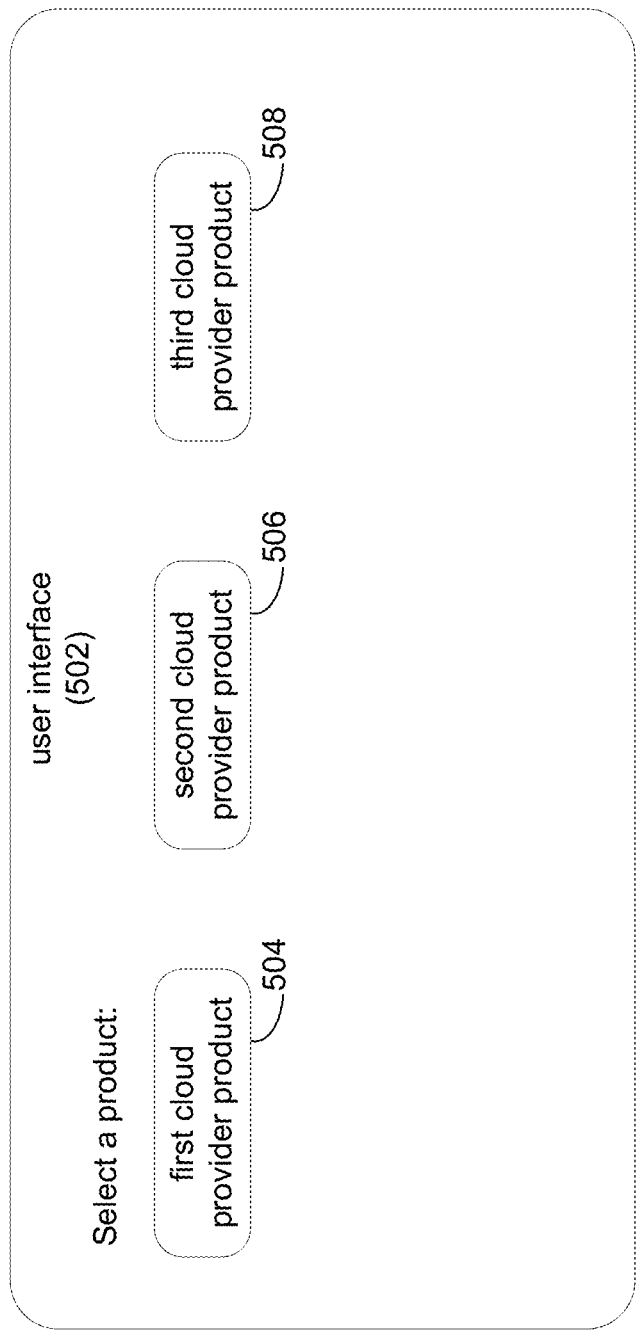

In some implementations, cloud deployment process 10 generates 312 a dynamic user interface using the input parameter file. For example, cloud deployment process 10 may use the input parameter file (e.g., input parameter file 528) to generate 312 a dynamic user interface. Referring also to FIG. 6 and as discussed above, suppose cloud deployment process 10 receives 300 a selection of a particular cloud provider product from a plurality of or catalog of cloud provider products (e.g., cloud provider products 504, 506, 508). In this example, suppose cloud deployment process 10 receives a selection of a first cloud provider product (e.g., first cloud provider product 504). Cloud deployment process 10 may expose 302 a cloud provider-specific product container associated with the product (e.g., cloud provider-specific product container 510) to the cloud manager (e.g., cloud manager 500). Cloud provider-specific product container 510 may obtain input parameter file 528 that includes particular parameters associated with the product. Referring again to FIG. 5, cloud provider-specific product container 510 may provide input parameter information (e.g., input parameter information 530) from input parameter file 528 that concerns the particular product. In this manner, cloud deployment process 10 allows cloud manager 500 to obtain input parameter information 530 without being specifically coded to interface directly with cloud provider 516. Rather, cloud provider-specific product container 510 may obtain input parameter file 528 that may be converted to a dynamic user interface.

In some implementations, generating 312 the dynamic user interface may include converting 314 the input parameter file from YAML format into a graphical user interface. For example and as discussed above, input parameter file 528 may be defined in a YAML format, which can be converted 314 into a dynamic user interface (e.g., user interface 502). For example and referring also to FIG. 7, cloud deployment process 10 may convert 316 input parameter file 528 (in YAML format) to a dynamic user interface (e.g., user interface 502 updated with input parameter information (e.g., input parameter information 530)). For example, various processes known in the art convert YAML files into a user interface. Accordingly, cloud deployment process 10 may generate 312 dynamic user interface 502 with the ability for a user to define a plurality of input parameters for the product.

Figure 7:
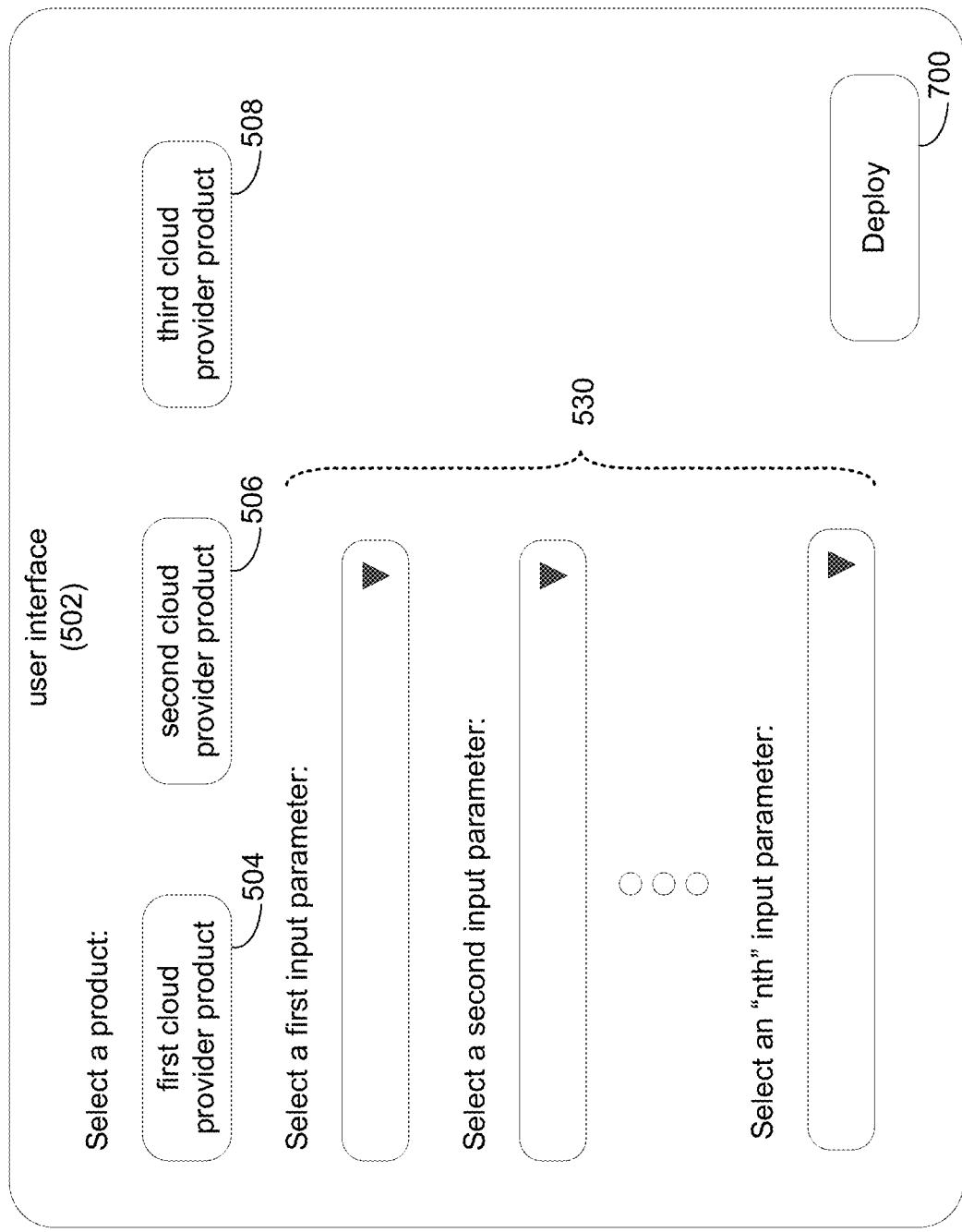

In some implementations, processing 306 the plurality of input parameters may include receiving 316, at the dynamic user interface, the plurality of input parameters based upon, at least in part, the input parameter file. For example and as shown in FIG. 7, cloud deployment process 10 may provide or present user interface 502 to a user. In this example, suppose user interface 502 includes input parameter information 530 (e.g., "n" input parameters). Accordingly, cloud deployment process 10 provides user interface features (e.g., via drop down menus, text entry boxes, etc.) configured to define the product.

In some implementations, exposing 302 the cloud provider-specific product container may include defining 318 one or more Identity and Access Management (IAM) policies for the product. For example, the cloud provider-specific product container provides Identity and Access Management (IAM) policies that define permissions and access on cloud provider resources in customer accounts in order to avoid access denied failures. These permissions prevent unauthorized access to other customer sensitive data/resources and/or may allow only required operations. In some implementations, the input parameter information (e.g., input parameter information 530) may include IAM policies for the product. In one example, a user may provide IAM information (e.g., account information, permission information, etc.) to enable the product to perform particular operations. For example, each product may require specific access permissions and roles on the cloud provider resources in order to perform create/modify/delete/get operations. In some implementations, the cloud provider-specific product container 510 embeds the policies required for each operation per cloud provider (e.g., as a JSON file). In some implementations, the cloud manager (e.g., cloud manager 500) reads the policies and create them on cloud provider, this way the customer accounts can be protected and prevent unauthorized access to other resources.

In some implementations, the IAM policies may include validation policies, deployment policies, lifecycle management policies, and un-deployment policies. For example, a validation policy may include permissions needed for resources required by a product container to perform validations. A deployment policy may include permissions needed in order create product-specific resources. A lifecycle management policy includes permissions needed for resource management on cloud provider. An un-deploy policy may include permissions needed on resource cleanup/delete in order to un-deploy a product instance on cloud provider infrastructure.

In some implementations, the cloud provider-specific product container may include a plurality of input parameter validations. An input parameter validation may generally include a validation service which contains business logic to validate whether inputs are valid and correct as per product deployment requirements. In some implementations, the input parameter validations act as a dry run to check whether all input parameters are acceptable on cloud provider infrastructure, have correct permissions, resource availability, etc. This may minimize the failures during the deployment and improves the cloud manager stability.

In one example, suppose a product supports only specific models on predefined regions/locations for particular cloud provider. The cloud manager (e.g., cloud manager 500) may invoke the validation service exposed from the cloud provider-specific container (e.g., cloud provider-specific product container 510). A user may provide a plurality of input parameter values in the user interface (as shown in FIG. 7). Cloud manager 500 may pass these input parameter values to cloud provider-specific product container 510. Cloud provider-specific product container 510 may connect to the selected cloud provider using API/CLI interfaces to execute the customized validations. In some implementations, the user may pass appropriate authentication and authorization credentials in order to execute/get information from cloud providers and/or the cloud manager may use common security context. Cloud provider 516 may validate the input parameters and send a response back to cloud manager 500. In this manner, cloud provider-specific product container 510 may include a plurality of input parameter validations configured to validate the plurality of input parameters provided by a user.

Figure 8:
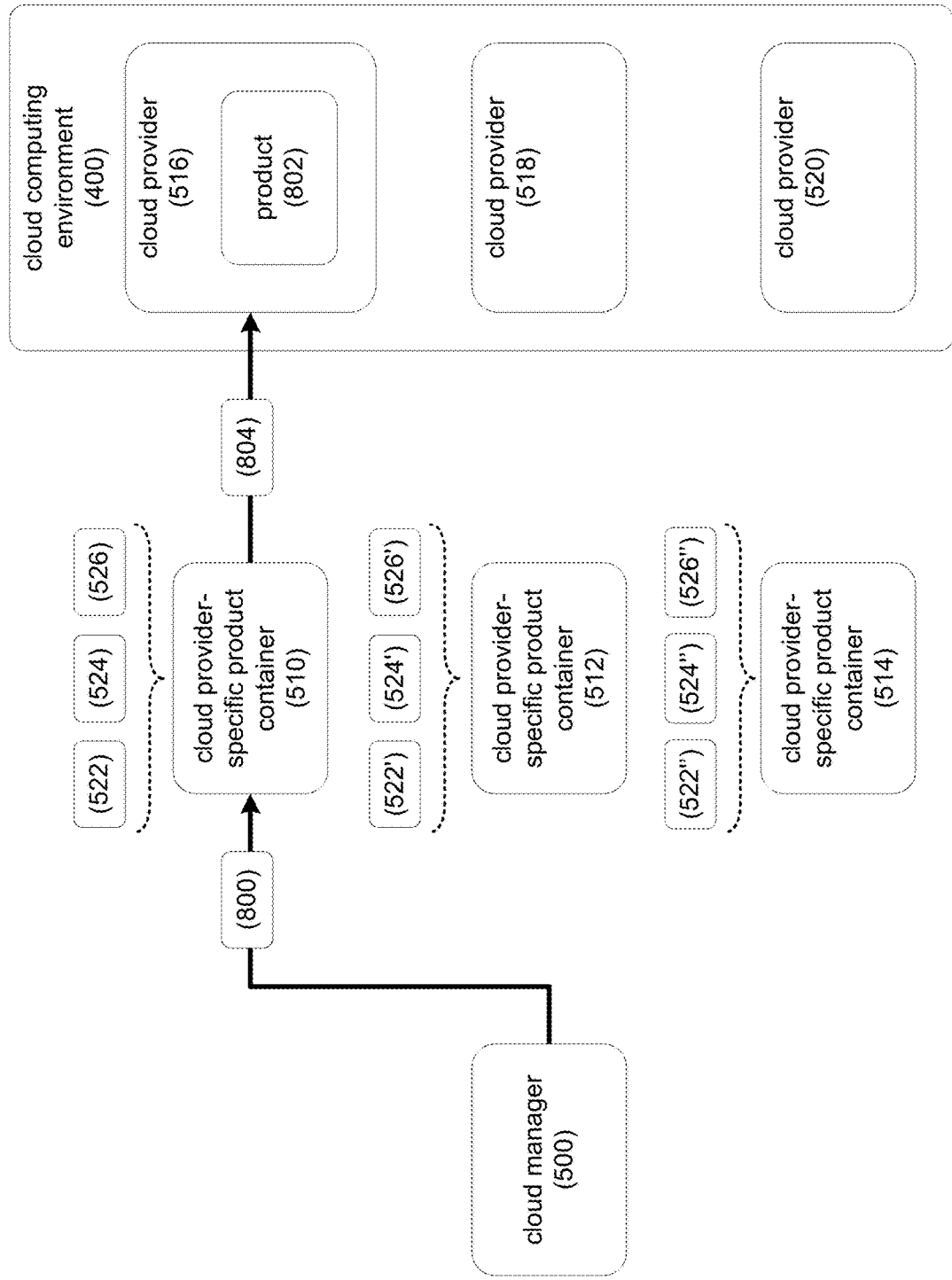

In some implementations, cloud deployment process 10 deploys 308 the product in the cloud computing environment using the cloud provider-specific product container and the plurality of input parameters. For example, the cloud manager (e.g., cloud manager 500) may initiate the product instance deployment in response to receiving a selection (e.g., via "deploy" button 700 of user interface 502) and once all the validation passes by invoking the deployment service exposed via the cloud provider-specific product container (e.g., cloud provider-specific product container 510). Referring also to FIG. 8 and in some implementations, the input parameters collected from the user are passed with appropriate authentication and authorization permissions (e.g., plurality of input parameters 800) in order to create resources in cloud provider user/customer accounts. Cloud deployment process 10 may, using cloud provider-specific product container 510, deploy 308 the product (e.g., product 802) on cloud computing environment 400 with the plurality of input parameters (e.g., plurality of input parameters 800). Specifically, cloud deployment process 10 may use various cloud provider-specific tools/SDKs/scripts (e.g., cloud provider-specific tools 804) to deploy 308 product 802 on cloud computing environment 400.

In some implementations, after deployment of product 802, product 802 may be in a ready state for operations by the user. With cloud provider-specific product container 510, cloud manager 500 can orchestrate product-specific configuration functions after successfully deploying instances such as upgrades, stopping/restarting services, collecting the metadata of the product instance including hardware and software components, and setting up any data protection capabilities as requested by the user. All of these services can be uniformly managed from cloud manager 500 using cloud provider-specific product container 510.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    receiving a selection of a product associated with a cloud provider for deployment in a cloud computing environment;
    exposing a cloud provider-specific product container associated with the product to a cloud manager, wherein the cloud provider-specific product container includes a plurality of input parameter validations;
    obtaining an input parameter file from the cloud provider using the cloud provider-specific product container;
    generating a dynamic user interface using the input parameter file, wherein the input parameter file is a YAML Ain't Markup Language (YAML) file, wherein generating the dynamic user interface includes converting the input parameter file from YAML format into a graphical user interface;
    processing a plurality of input parameters based upon, at least in part, the input parameter file, wherein processing the plurality of input parameters includes processing the plurality of input parameter validations to determine whether the plurality of input parameters are acceptable for deployment in the cloud computing environment; and
    deploying the product in the cloud computing environment using the cloud provider-specific product container and the plurality of input parameters.

2. The computer-implemented method of claim 1, wherein receiving the selection of the product to deploy in the cloud computing environment includes receiving the selection of the product from a catalog of products.

3. The computer-implemented method of claim 1, wherein exposing the cloud provider-specific product container includes defining one or more Identity and Access Management (IAM) policies for the product.

4. The computer-implemented method of claim 1, wherein processing the plurality of input parameters includes receiving, at the dynamic user interface, the plurality of input parameters based upon, at least in part, the input parameter file.

5. The computer-implemented method of claim 1, wherein deploying the product in the cloud computing environment includes deploying the product in the cloud computing environment by executing one or more application programming interfaces (APIs) exposed by the cloud provider-specific product container and the plurality of input parameters.

6. A computer program product residing on a non-transitory computer readable medium having a plurality of instructions stored thereon which, when executed by a processor, cause the processor to perform operations comprising:
    receiving a selection of a product associated with a cloud provider for deployment in a cloud computing environment;
    exposing a cloud provider-specific product container associated with the product to a cloud manager, wherein the cloud provider-specific product container includes a plurality of input parameter validations;
    obtaining an input parameter file from the cloud provider using the cloud provider-specific product container;
    generating a dynamic user interface using the input parameter file, wherein the input parameter file is a YAML Ain't Markup Language (YAML) file, wherein generating the dynamic user interface includes converting the input parameter file from YAML format into a graphical user interface;
    processing a plurality of input parameters based upon, at least in part, the input parameter file, wherein processing the plurality of input parameters includes processing the plurality of input parameter validations to determine whether the plurality of input parameters are acceptable for deployment in the cloud computing environment; and
    deploying the product in the cloud computing environment using the cloud provider-specific product container and the plurality of input parameters.

7. The computer program product of claim 6, wherein receiving the selection of the product to deploy in the cloud computing environment includes receiving the selection of the product from a catalog of products.

8. The computer program product of claim 6, wherein exposing the cloud provider-specific product container includes defining one or more Identity and Access Management (IAM) policies for the product.

9. The computer program product of claim 6, wherein processing the plurality of input parameters includes receiving, at the dynamic user interface, the plurality of input parameters based upon, at least in part, the input parameter file.

10. The computer program product of claim 6, wherein deploying the product in the cloud computing environment includes deploying the product in the cloud computing environment by executing one or more application programming interfaces (APIs) exposed by the cloud provider-specific product container and the plurality of input parameters.

11. A computing system comprising:
a memory; and
a processor configured to receive a selection of a product associated with a cloud provider for deployment in a cloud computing environment, wherein the processor is further configured to expose a cloud provider-specific product container associated with the product to a cloud manager, wherein the cloud provider-specific product container includes a plurality of input parameter validations, wherein the processor is further configured to obtain an input parameter file from a cloud provider using the cloud provider-specific product container, wherein the processor is further configured to generate a dynamic user interface using the input parameter file, wherein the input parameter file is a YAML Ain't Markup Language (YAML) file, wherein generating the dynamic user interface includes converting the input parameter file from YAML format into a graphical user interface, wherein the processor is further configured to process a plurality of input parameters based upon, at least in part, the input parameter file, wherein processing the plurality of input parameters includes processing the plurality of input parameter validations to determine whether the plurality of input parameters are acceptable for deployment in the cloud computing environment, and wherein the processor is further configured to deploy the product in the cloud computing environment using the cloud provider-specific product container and the plurality of input parameters.

12. The computing system of claim 11, wherein receiving the selection of the product to deploy in the cloud computing environment includes receiving the selection of the product from a catalog of products.

* * * * *